(12) United States Patent
Wang et al.

(10) Patent No.: US 7,642,393 B2
(45) Date of Patent: Jan. 5, 2010

(54) PROCESS FOR REMOVING AT LEAST BENZENE FROM HYDROCARBON STREAMS

(75) Inventors: Hua Wang, Clifton Park, NY (US); Sean Russell Baggott, Foothill Ranch, CA (US); Harold James Eggert, The Woodlands, TX (US); Neil Edwin Moe, Minnetonka, MN (US)

(73) Assignee: General Electric Company, Niskayuna, NY (US)

( * ) Notice: Subject to any disclaimer, the term of this patent is extended or adjusted under 35 U.S.C. 154(b) by 272 days.

(21) Appl. No.: 11/543,363

(22) Filed: Oct. 5, 2006

(65) Prior Publication Data

US 2008/0086021 A1    Apr. 10, 2008

(51) Int. Cl.
*C07C 7/144*    (2006.01)
(52) U.S. Cl. ............... 585/819; 585/818; 203/DIG. 19
(58) Field of Classification Search ........................ None
See application file for complete search history.

(56) References Cited

U.S. PATENT DOCUMENTS

| | | | |
|---|---|---|---|
| 2,970,106 A | | 1/1961 | Binning et al. |
| 3,586,728 A | | 6/1971 | Otani et al. |
| 4,053,388 A | * | 10/1977 | Bailey ..................... 208/89 |
| 4,532,029 A | | 7/1985 | Black et al. |
| 5,120,900 A | | 6/1992 | Chen et al. |
| 5,273,644 A | | 12/1993 | Wegerer |
| 5,435,918 A | | 7/1995 | Welmers et al. |
| 5,856,602 A | | 1/1999 | Gildert et al. |
| 5,905,182 A | * | 5/1999 | Streicher et al. ............ 585/804 |
| 5,914,435 A | * | 6/1999 | Streicher et al. ............ 585/819 |
| 6,187,980 B1 | | 2/2001 | Gildert |
| 6,187,987 B1 | | 2/2001 | Chin et al. |
| 6,855,853 B2 | | 2/2005 | Groten et al. |

FOREIGN PATENT DOCUMENTS

| | | |
|---|---|---|
| DE | 19741470 A1 | 3/1998 |
| DE | 19741471 A1 | 3/1998 |
| EP | 0760251 A1 | 3/1997 |
| WO | WO0110802 A1 | 2/2001 |
| WO | WO03010119 A1 | 2/2003 |

(Continued)

OTHER PUBLICATIONS http://www.uop.com/objects/2004NPRAPaperLightParaf-finIsomerization.pdf—"New Solutions for Light Paraffin Isomerization", Anderson et al. Copyright 2004 UOP LLC, AM-04-46, pp. 1-4.

(Continued)

*Primary Examiner*—Tam M Nguyen
(74) *Attorney, Agent, or Firm*—Mary Louise Gioeni (57) ABSTRACT

A method of removing at least benzene from a hydrocarbon stream comprises concentrating aromatics in the hydrocarbon stream by passing the hydrocarbon stream through a membrane unit having at least one membrane to produce a permeate stream and a retentate stream, wherein the permeate stream is aromatics rich relative to the hydrocarbon stream; and extracting aromatics after concentrating using a selective aromatics extraction solvent in an extraction unit to produce an extract stream, wherein the extract stream is aromatics rich relative to the permeate stream.

3 Claims, 4 Drawing Sheets

FOREIGN PATENT DOCUMENTS

| WO | WO2004069962 A1 | 8/2004 |
|---|---|---|
| WO | WO 2005/049181 A1 | 6/2005 |

OTHER PUBLICATIONS http://www.cdtech.com/updates/Publications/Refining%20Papers/Benzene%20Reduction.pdf#search=%22benzene%20saturation%20unit%22 <http://www.cdtech.com/updates/Publications/Refining%20Papers/Benzene%20Reduction.pdf>, "Benzene Saturation in Gasoline", CDTech, pp. 1-11.

http://www.cdtech.com/updates/Publications/Refining%20Papers/Benzene%20Reduction.pdf#search=%22benzene%20saturation%20unit%22 <http://www.cdtech.com/updates/Publications/Refining%20Papers/Benzene%20Reduction.pdf> "Selective Hydrogenation of Benzene in Reformate", CDHYDRO, CDTECH.

"Handbook of Petroleum Refining Processes", 3rd Ed., Robert A. Meyers Editor, McGraw-Hill, 2003. Catalytic Naphtha Reforming, 2nd Ed., GeorgeJ. Antosand Bbdullh M.Aitani Editor, MarcelDekker,2004.

PCT International Search Report dated Jun. 5, 2009.

* cited by examiner

PROCESS FOR REMOVING AT LEAST BENZENE FROM HYDROCARBON STREAMS

BACKGROUND

The present disclosure generally relates to methods of removing aromatics such as benzene from hydrocarbon streams, and more particularly to membrane, extraction, and hydrogenation methods for removing at least benzene from hydrocarbon streams.

Another aspect of the present disclosure relates to methods of increasing recovery of high purity aromatic benzene, toluene, and xylene (BTX) from hydrocarbon streams, and more particularly to membrane, and extraction methods for enhanced BTX production from hydrocarbon streams.

The Environmental Protection Agency (EPA) has mandated a near complete elimination of benzene from gasoline. More specifically, the benzene limit is set at a maximum of 1.0 volume percent of gasoline. However, if a company elects to use the "yearly pool average" standard of measuring benzene in gasoline, the company's total gasoline pool must meet a yearly benzene average limit of 0.95 volume percent with no gasoline batch exceeding 1.5 volume percent benzene.

For most refiners, the catalytic reformer represents the major source of benzene in the gasoline pool. In catalytic reforming, a hydrocarbon feed such as naphtha is passed over a metal catalyst such as platinum at an elevated temperature and pressure. The catalyst reforms the molecular structure of the hydrocarbons contained in the naphtha by removing hydrogen and rearranging the structure of the molecules so as to improve the octane number of the naphtha. Because of the multiplicity of compounds in the raw naphtha, the actual reactions that take place in the catalytic reformer are numerous.

One strategy to manage benzene production is to minimize benzene and benzene precursors in the reformer feed. While successful in reducing benzene production, benzene is still produced in the reformer. As such, other strategies to manage benzene have been considered where benzene is converted, destroyed, or separated after it is produced in the reformer.

With regard to benzene separation, benzene may be recovered as part of a benzene, toluene, and xylene (BTX) production process, which generally employs staged distillation and extraction. However, distillation is an energy intensive and costly process.

Accordingly, a continual need exists for improved methods of recovering at least benzene from hydrocarbon streams.

BRIEF SUMMARY

Disclosed herein are processes of removing benzene and for the separation of benzene, toluene, and xylene from hydrocarbon streams.

In one embodiment, a method of removing benzene from a hydrocarbon stream comprises concentrating aromatics in the hydrocarbon stream by passing the hydrocarbon stream through a membrane unit having at least one membrane to produce a permeate stream and a retentate stream, wherein the permeate stream is aromatics rich relative to the hydrocarbon stream; and extracting aromatics after concentrating using a selective aromatics extraction solvent in an extraction unit to produce an extract stream, wherein the extract stream is aromatics rich relative to the permeate stream.

In one embodiment, a method of removing benzene from a hydrocarbon stream comprises concentrating benzene using a membrane unit having at least one membrane to produce a permeate stream and a retentate stream, wherein the permeate stream is benzene rich relative to the permeate stream; introducing hydrogen and the permeate stream into a benzene saturation unit; and saturating benzene with hydrogen to produce cyclohexane in the benzene saturation unit.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Disclosed herein are methods for removing at least benzene from a hydrocarbon feed stream (e.g., reformate, pyrolysis gasoline (pygas), coke oven light oil (COLO), and the like). As will be discussed in greater detail, the method of removing benzene may be employed as part of a benzene, toluene, and xylene (BTX) production process. Unlike prior art methods, the methods of removing at least benzene from hydrocarbon feed streams disclosed herein employ membrane separation of a hydrocarbon feed stream to concentrate aromatics before they are extracted or before benzene is saturated with hydrogen. In describing the benzene production methods, reference is made to various separation and extraction apparatus with the understanding that the methods are not to be limited to the apparatus discussed in the various embodiments.

In the descriptions that follow, an "upstream" direction refers to the direction from which the local flow is coming, while a "downstream" direction refers to the direction in which the local flow is traveling. In the most general sense, flow through the system tends to be from front to back, so the "upstream direction" will generally refer to a forward direction, while a "downstream direction" will refer to a rearward direction. The term "direct fluid communication" as used herein refers to a communication between a first point and a second point in a system that is uninterrupted by the presence of additional devices.

Figure 1:
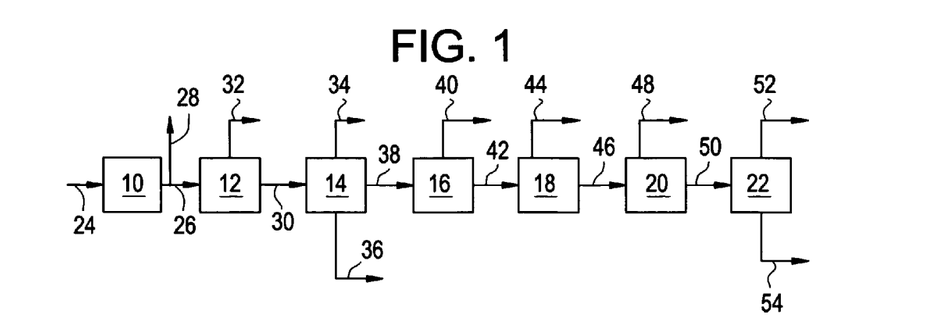
FIG. 1 is a schematic illustration of an embodiment of a method of separating at least benzene from a hydrocarbon feed stream using membrane separation to concentrate aromatics prior to pre-fractionation and extraction.

Referring to FIG. 1, a schematic illustration of an embodiment of a method of separating at least benzene from a hydrocarbon feed stream using membrane separation to concentrate aromatics prior to pre-fractionation and extraction is illustrated. The method for removing at least benzene from a hydrocarbon feedstock comprises concentrating aromatics from the feedstock before it is pre-fractionated and extracted. The method is discussed hereinafter in relation to benzene, toluene, and xylene (BTX) production merely for ease in discussion to illustrate various optional embodiments. In describing the method, reference is made to the following apparatus that may be employed in practicing the method: a reformer 10, a membrane unit 12, a pre-fractionation unit 14, an extraction unit 16, a benzene column 18, a toluene column 20, and a xylene column 22. The arrangement and selection of the apparatus varies depending on the desired application.

In one embodiment, a hydrocarbon feedstock 24 is fed to the reformer 10 where the hydrocarbon feedstock 24 is catalytically reacted to produce a reformate stream 26 that is rich in aromatic compounds. The term "rich" is being used herein to describe a concentration relative to a feed (e.g., hydrocarbon feedstock 24), wherein a concentration of a given component (e.g., aromatics) is greater in the rich stream than in the feed stream. In one embodiment, the hydrocarbon feedstock 24 comprises a petroleum distillate (e.g., naphtha). The catalyst employed in the reformer 10 varies depending on the desired application. Suitable catalysts employed in the reformer 10 include, but are not limited to, but are not limited to those discussed in "Catalyst Naphtha Reforming", $2^{nd}$ Ed., George J. Antos and Abdullh M Aitani Editor, Marcel Dekker, 2004 and "Handbook of Petroleum Refining Processes", $3^{rd}$ Ed. Robert A. Meyers Editor, McGraw-Hill, 2003. For example, suitable catalyst compositions include formulations based on platinum, which may be employed alone or in combination with rhenium, tin, or iridium. A portion of the reformate stream 26 illustrated as stream 28 may be diverted from the reformate stream 26 to be used as an additive to gasoline or the like.

The reformate stream 26 is in fluid communication with the membrane unit 12. The membrane unit 12 comprises one or more membranes arranged in any suitable fashion, generally within a housing. For example, the one or more membranes of the membrane unit 12 can be spirally wound, plate and frame, hollow-fiber, or the like. As is readily understood in the art, the membrane unit 12 can further comprise support members, end plates, and the like. The selectivity of the membrane(s) of membrane unit 12 varies depending on the desired application.

Selectivity is calculated by dividing the weight ratio of aromatics to aliphatics on the permeate side by the weight ratio of aromatics to aliphatics on the feed side. The selectivity for the applications disclosed herein can be greater than or equal to about 2, within this range the selectivity can be greater than or equal to about 3. In one embodiment, the membranes of the membrane unit are permselective to aromatics.

The membrane comprises a material that is permselective to aromatic hydrocarbons and stable at the operating conditions. For example, the membrane unit 12 comprises a polymeric membrane. The term polymer includes, but is not limited to, homopolymers, copolymers, terpolymers, prepolymers, polymer blends, and oligomers. For example, suitable polymers include, but are not limited to, polyesters, polyethers, polysulfones, polyimides, polyamides, polymers derived from bisphenol-A dianhydride, polyvinyl alcohols, polyacrylonitriles, polyurethanes, polyureas, polyacrylic acids, polyacrylates, elastomeric polymers such as polybutadiene, polyisoprenes, polyvinylpyridines, halogenated polymers, fluoroelastomers, polyvinyl halides, polysiloxanes, poly dimethyl siloxanes, a copolymer comprising at least one of the foregoing polymers, a blend comprising at least one of the foregoing polymers, an alloy comprising at least one of the foregoing polymers, or a combination comprising at least one of the foregoing polymers, copolymers, blends, or alloys. The polymers could be further physically or chemically cross-linked to increase chemical stability.

The membrane unit 12 generates a permeate stream 30 and a retentate stream 32 using perstractive separation techniques, pervaporation separation techniques, and the like. For example, the reformate stream 26 is passed along one side of a membrane of the membrane unit 12 and a vacuum is applied to the membrane at the opposite side so that the aromatics selectively permeate through the membrane to produce the permeate stream 30 (i.e., pervaporation). In other embodiments, the reformate stream 26 is passed along one side of a membrane of the membrane unit 12 and a sweep gas or liquid is passed on the opposite side of the membrane (i.e., perstraction).

In one embodiment, the retentate stream 32 can be used as a blend stock for gasoline and the like without further processing. The permeate stream 30 is in fluid communication with the pre-fractionation unit 14, which may be a distillation device such as a distillation column. In one embodiment, the membrane unit 12 is disposed upstream of and in direct fluid communication with the pre-fractionation unit 14. The pre-fractionation unit 14 separates the permeate stream 30 into an overhead stream 34, a bottom stream 36, and an intermediate stream 38. The intermediate stream 38 comprises a C6-C8 fraction, which is further processed in the extraction unit 16.

The extraction unit 16 is disposed downstream of and in fluid communication with the pre-fractionation unit 14. The extraction unit 16 employs a selective aromatics extraction solvent to produce an aromatics rich extract stream 42 and an aromatics lean raffinate stream 40. The raffinate stream 40 can be used as a blending component of gasoline or used in aliphatic solvents. Suitable aromatic extraction solvents include, but are not limited to, tetrahydrothiophene 1,1 dioxide (Sulfolane), propylene carbonate (PC), diethylene glycol (DEG), triethylene glycol, and tetraethylene glycol, N-methyl pyrollidone (NMP), N-formyl morpholine, phenol, furfural, N,N-dimethyl formamide (DMF), dimethyl sulfoxide (DMSO), and dimethyl-acetamide (DMAc).

In various embodiments, the extract stream 42 may be further processed to separate various aromatic components. For example, in one embodiment, the extract stream 42 is in fluid communication with the benzene column 18 such that benzene is removed from the extract stream 42 as a benzene overhead stream 44. In other words, the benzene overhead stream 44 is benzene rich compared to the extract stream 42, whereas a benzene bottom stream 46 is benzene lean. The benzene column 18 can be a fractional distillation device. The number of trays, reflux ratio, and the like of the distillation device vary depending on the desired composition of the benzene overhead stream 44.

The benzene bottom stream 46 of the benzene column 18 may be further processed to remove other aromatics (e.g., toluene and xylene). For example, the benzene bottoms stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 can each be fractional distillation devices. Again, the number of trays, reflux ratio, and the like of the distillation device vary depending on the desired composition of the respective toluene overhead stream 48 and the xylene overhead stream 52.

Figure 2:
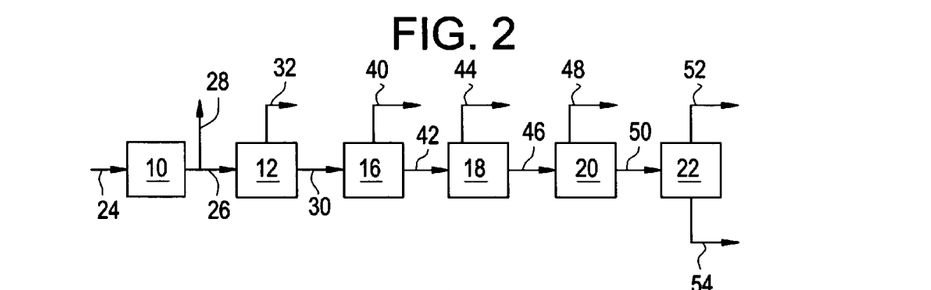
FIG. 2 is a schematic illustration of an embodiment of a method of separating at least benzene from a hydrocarbon stream using membrane separation to concentrate aromatics prior to extraction without pre-fractionation.

Referring to FIG. 2, a schematic illustration of an embodiment of a method of separating at least benzene from a hydrocarbon feed stream using membrane separation to concentrate aromatics prior to extraction without pre-fractionation is illustrated. In this embodiment, the hydrocarbon feedstock 24 is fed to the reformer 10 where the hydrocarbon feedstock 24 is catalytically reacted to produce the reformate stream 26 that is rich in aromatic compounds. The stream 28 may be diverted from the reformate stream 26 to be used as an additive to gasoline or the like.

The reformate stream 26 is in fluid communication with the membrane unit 12. The membrane unit 12 generates a permeate stream 30 and a retentate stream 32 using perstractive separation techniques, pervaporation separation techniques, and the like. The permeate stream 30 is in fluid communication with the extraction unit 16. In one embodiment, the membrane unit 12 is disposed upstream of and in direct fluid communication with the extraction unit 16. The extraction unit 16 employs a selective aromatics extraction solvent to produce an aromatics rich extract stream 42 and an aromatics lean raffinate stream 40.

The extract stream 42 may be further processed to separate valuable aromatic components. For example, in one embodiment, the extract stream 42 is in fluid communication with the benzene column 18 such that benzene is removed from the extract stream 42 as a benzene overhead stream 44. The benzene bottom stream 46 of the benzene column 18 may be further processed to remove other valuable aromatics. For example, the benzene bottoms stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 are each fractional distillation devices.

Figure 3:
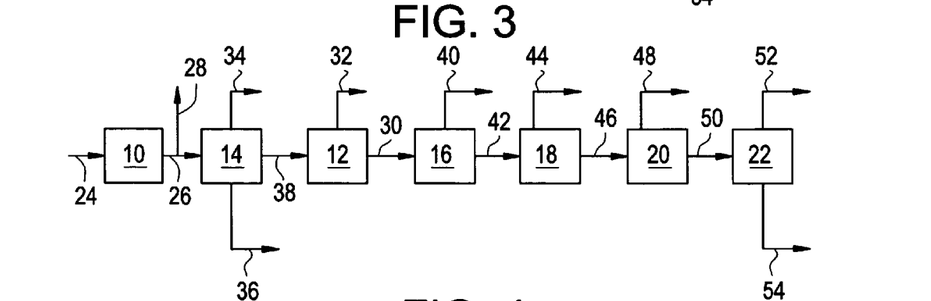
FIG. 3 is a schematic illustration of an embodiment of a method of separating at least benzene from a hydrocarbon feed stream using membrane separation to concentrate aromatics prior to extraction.

FIG. 3 is a schematic illustration of an embodiment of a method of separating at least benzene from a hydrocarbon feed stream using membrane separation to concentrate aromatics prior to extraction. In this embodiment, the hydrocarbon feedstock 24 is fed to the reformer 10 where the hydrocarbon feedstock 24 is catalytically reacted to produce the reformate stream 26 that is rich in aromatic compounds. The stream 28 may be diverted from the reformate stream 26 to be used as an additive to gasoline or the like.

The reformate stream 26 is in fluid communication with the pre-fractionation unit 14. In one embodiment, the pre-fractionation unit 14 is disposed upstream of and in direct fluid communication with the membrane unit 12. The pre-fractionation unit 14 separates the reformate stream 26 into an overhead stream 34, a bottom stream 36, and an intermediate stream 38. The intermediate stream 38 comprises a C6-C8 fraction, which is further processed in the membrane unit 12.

Again, in operation, the membrane unit 12 generates a permeate stream 30 and a retentate stream 32 using perstractive separation techniques, pervaporation separation techniques, and the like. The permeate stream 30 is in fluid with the extraction unit 16. In one embodiment, the membrane unit 12 is disposed upstream of and in direct fluid communication with the extraction unit 16. The extraction unit 16 employs a selective aromatics extraction solvent to produce an aromatics rich extract stream 42 and an aromatics lean raffinate stream 40.

The extract stream 42 may be further processed to separate valuable aromatic components. For example, in one embodiment, the extract stream 42 is in fluid communication with the benzene column 18 such that benzene is removed from the extract stream 42 as a benzene overhead stream 44. The benzene bottom stream 46 of the benzene column 18 may be further processed to remove other valuable aromatics. For example, the benzene bottoms stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 are each fractional distillation devices.

Figure 4:
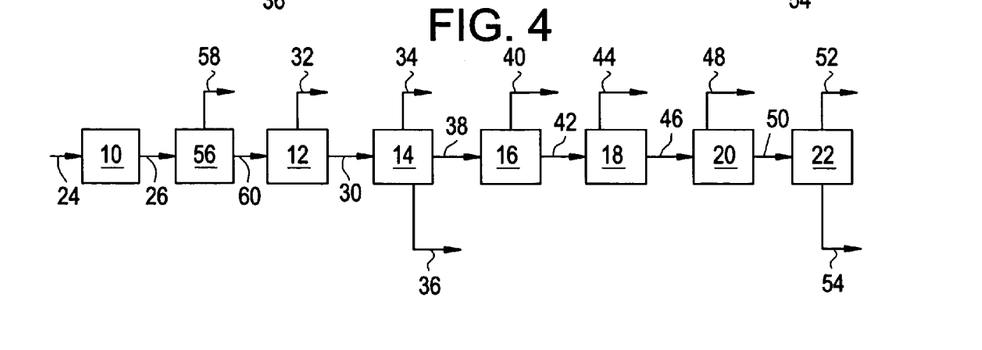
FIG. 4 is a schematic illustration of an embodiment of a method of separating at least benzene from a hydrocarbon feed stream using membrane separation to concentrate aromatics prior to pre-fractionation and extraction.

FIG. 4 is a schematic illustration of an embodiment of a method of separating at least benzene from a hydrocarbon feed stream using membrane separation to concentrate aromatics prior to pre-fractionation and extraction. The hydrocarbon feedstock 24 is fed to the reformer 10 where the hydrocarbon feedstock 24 is catalytically reacted to produce a reformate stream 26 that is rich in aromatic compounds. The reformate stream 26 is in fluid communication with an optional second membrane unit 56, which is disposed downstream of and in fluid communication with the reformer 10, and is disposed upstream of in and fluid communication with the membrane unit 12.

The second membrane unit 56 comprises one or more membranes arranged in any suitable fashion, generally within a housing. For example, the one or more membranes of the second membrane unit 56 can be spirally wound, plate-and-frame, hollow fiber, or the like. As is readily understood in the art, the second membrane unit 56 can further comprise support members, end plates, and the like. The selectivity of the membrane(s) of membrane unit 56 varies depending on the desired application. In one embodiment, the membranes of the second membrane unit 56 are permselective to aromatics.

The second membrane unit 56 comprises a polymer membrane. Suitable polymers include, but are not limited to, those polymers discussed above in relation to the membrane unit 12. In operation, the second membrane unit 56 generates a permeate stream 60 and a retentate stream 58 using perstractive separation techniques, pervaporation separation techniques, and the like. The retentate stream 58 can be used as a blend stock for gasoline or recycled back to the reformer 10 for further processing. The permeate stream 60 is in fluid communication with the membrane unit 12. In one embodiment, the second membrane unit 56 can be disposed upstream of and in direct fluid communication with the membrane unit 12. For example, the second membrane unit 56 can be arranged in series with the membrane unit 12. In operation, the membrane unit 12 generates a permeate stream 30 and a retentate stream 32.

The membrane unit 12 is disposed upstream of and in direct fluid communication with the pre-fractionation unit 14. The pre-fractionation unit 14 separates the permeate stream 30 into an overhead stream 34, a bottom stream 36, and an intermediate stream 38. The intermediate stream 38 comprises a C6-C8 fraction, which is further processed in the extraction unit 16. The extraction unit 16 is disposed downstream of and in fluid communication with the pre-fractionation unit 14. The extraction unit 16 employs a selective aromatics extraction solvent to produce an aromatics rich extract stream 42 and an aromatics lean raffinate stream 40.

The extract stream 42 may be further processed to separate various aromatic components. For example, in one embodiment, the extract stream 42 is in fluid communication with the benzene column 18 such that benzene is removed from the extract stream 42 as a benzene overhead stream 44. In other words, the benzene overhead stream 44 is benzene rich compared to the extract stream 42, whereas a benzene bottom stream 46 is benzene lean. The benzene bottom stream 46 of the benzene column 18 may be further processed to remove other aromatics (e.g., toluene and xylene). For example, the benzene bottoms stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 can each be fractional distillation devices.

Figure 5:
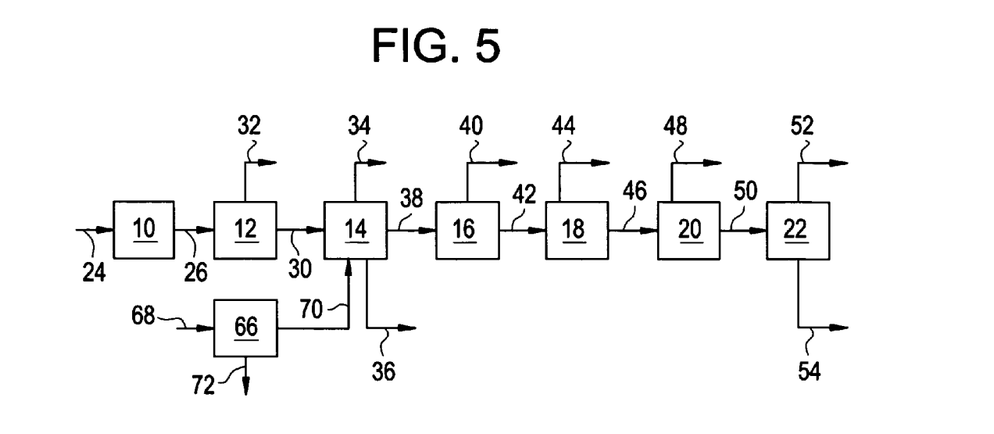
FIG. 5 is a schematic illustration of an embodiment of a method of separating at least benzene from a hydrocarbon feed stream using membrane separation to concentrate aromatics prior to pre-fractionation and extraction.

Referring to FIG. 5, a schematic illustration of an embodiment of a method of separating at least benzene from a hydrocarbon feed stream using membrane separation to concentrate aromatics prior to pre-fractionation and extraction is illustrated. This embodiment is similar to the embodiment illustrated in FIG. 1 with the exception that an optional second membrane unit 66 is employed.

Like the embodiment illustrated in FIG. 1, the hydrocarbon feedstock 24 is fed to the reformer 10 where the hydrocarbon feedstock 24 is catalytically reacted to produce a reformate stream 26 that is rich in aromatic compounds. The reformate stream 26 is in fluid communication with the membrane unit 12. The membrane unit 12 generates a permeate stream 30 and a retentate stream 32 using perstractive separation techniques, pervaporation separation techniques, and the like.

The permeate stream 30 is in fluid communication with the pre-fractionation unit 14. In one embodiment, the membrane unit 12 is disposed upstream of and in direct fluid communication with the pre-fractionation unit 14. At the same time, the second membrane unit 66 is also disposed upstream of and fluid communication with the pre-fractionation unit 14. More specifically, the second membrane unit 66 is arranged parallel to the membrane unit 12, and receives a make-up feed 68. The make-up feed 68 comprises a hydrocarbon feedstock. For example, the make-up stream 68 can comprise a similar or different composition than the hydrocarbon feedstock 24. In one embodiment, the make-up feed 68 comprises reformed petroleum naphtha (reformate), pyrolysis gasoline (pygas), or coke oven light oil (COLO). The make-up feed advantageously allows the pre-fractionation unit 14 to utilize its maximum capacity since the permeate stream 30 has significantly lower flow rate than the reformate stream 26.

The second membrane unit 66 comprises one or more membranes arranged in any suitable fashion, generally within a housing. For example, the one or more membranes of the second membrane unit 66 can be spirally wound, plate-and-frame, hollow fiber, or the like. As is readily understood in the art, the second membrane unit 66 can further comprise support members, end plates, and the like. The selectivity of the membrane(s) of membrane unit 66 varies depending on the desired application. In one embodiment, the membranes of the second membrane unit 66 are permselective to aromatics.

The second membrane unit 66 comprises a polymer membrane. Suitable polymers include, but are not limited to, those polymers discussed above in relation to the membrane unit 12. In operation, the second membrane unit 66 generates a permeate stream 72 and a retentate stream 70 using perstractive separation techniques, pervaporation separation techniques, and the like. The retentate stream 70 can be used as a blend stock for gasoline or recycled back to the reformer 10 for further processing. The permeate stream 72 is in fluid communication with the pre-fractionation unit 14.

The pre-fractionation unit 14 separates the permeate stream 30 and the permeate stream 70 into an overhead stream 34, a bottom stream 36, and an intermediate stream 38. The intermediate stream 38 comprises a C6-C8 fraction, which is further processed in the extraction unit 16. The extraction unit 16 is disposed downstream of and in fluid communication with the pre-fractionation unit 14. The extraction unit 16 employs a selective aromatics extraction solvent to produce an aromatics rich extract stream 42 and an aromatics lean raffinate stream 40.

The extract stream 42 may be further processed to separate various aromatic components. For example, in one embodiment, the extract stream 42 is in fluid communication with the benzene column 18 such that benzene is removed from the extract stream 42 as a benzene overhead stream 44. In other words, the benzene overhead stream 44 is benzene rich compared to the extract stream 42, whereas a benzene bottom stream 46 is benzene lean. The benzene bottom stream 46 of the benzene column 18 may be further processed to remove other aromatics (e.g., toluene and xylene). For example, the benzene bottom stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 can each be fractional distillation devices.

Figure 6:
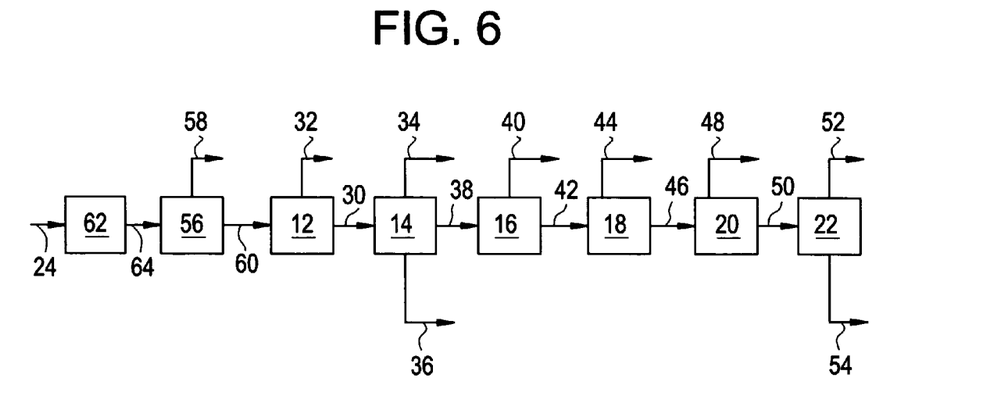
FIG. 6 is a schematic illustration of an embodiment of a method of separating at least benzene from a hydrocarbon feed stream using membrane separation to concentrate aromatics prior to pre-fractionation and extraction.

FIG. 6 is a schematic illustration of an embodiment of a method of separating at least benzene from a hydrocarbon feed stream using membrane separation to concentrate aromatics prior to pre-fractionation and extraction. This embodiment is similar to the embodiment illustrated in FIG. 4 with the exception that a pyrolysis unit 62 is employed in lieu of the reformer 10 (FIG. 4). In other words, this embodiment illustrates the flexibility of producing aromatics from a hydrocarbon feedstock. The term "pyrolysis" is being used herein to generically refer to the chemical decomposition of organic materials by heating in the absence of oxygen or any other reagents, except possibly steam.

The hydrocarbon feedstock 24 is fed to the pyrolysis unit 62, where it is heated to produce a pyrolysis stream 64 that is rich in aromatic compounds. In various embodiments, the pyrolysis unit 62 can employ hydrous pyrolysis or anhydrous pyrolysis to produce the pyrolysis stream 64. The pyrolysis stream 64 is in fluid communication with the optional second membrane unit 56, which is disposed downstream of and in fluid communication with the pyrolysis unit 62, and is disposed upstream of in and fluid communication with the membrane unit 12.

The second membrane unit 56 generates a permeate stream 60 and a retentate stream 58 using perstractive separation techniques, pervaporation separation techniques, and the like. The retentate stream 58 can be used as a blend stock for gasoline or recycled back to the reformer 10 for further processing. The permeate stream 60 is in fluid communication with the membrane unit 12. In one embodiment, the second membrane unit 56 can be disposed upstream of and in direct fluid communication with the membrane unit 12. For example, the second membrane unit 56 can be arranged in series with the membrane unit 12. In operation, the membrane unit 12 generates a permeate stream 30 and a retentate stream 32.

The membrane unit 12 is disposed upstream of and in direct fluid communication with the pre-fractionation unit 14. The pre-fractionation unit 14 separates the permeate stream 30 into an overhead stream 34, a bottom stream 36, and an intermediate stream 38. The intermediate stream 38 comprises a C6-C8 fraction, which is further processed in the extraction unit 16. The extraction unit 16 is disposed downstream of and in fluid communication with the pre-fractionation unit 14. The extraction unit 16 employs a selective aromatics extraction solvent to produce an aromatics rich extract stream 42 and an aromatics lean raffinate stream 40.

The extract stream 42 may be further processed to separate various aromatic components. For example, in one embodiment, the extract stream 42 is in fluid communication with the benzene column 18 such that benzene is removed from the extract stream 42 as a benzene overhead stream 44. In other words, the benzene overhead stream 44 is benzene rich compared to the extract stream 42, whereas a benzene bottom stream 46 is benzene lean. The benzene bottom stream 46 of the benzene column 18 may be further processed to remove other aromatics (e.g., toluene and xylene). For example, the benzene bottom stream 46 is fed to the toluene column 20 such that toluene is removed from the benzene bottom stream 46 as a toluene overhead stream 48 that is toluene rich compared to the benzene bottom stream 46. A toluene bottom stream 50 from the toluene column 20 may further be fed to the xylene column 22, wherein it is split into a xylene top stream 52 and a xylene bottom stream 54. The toluene column 20 and the xylene column 22 can each be fractional distillation devices.

Figure 7:
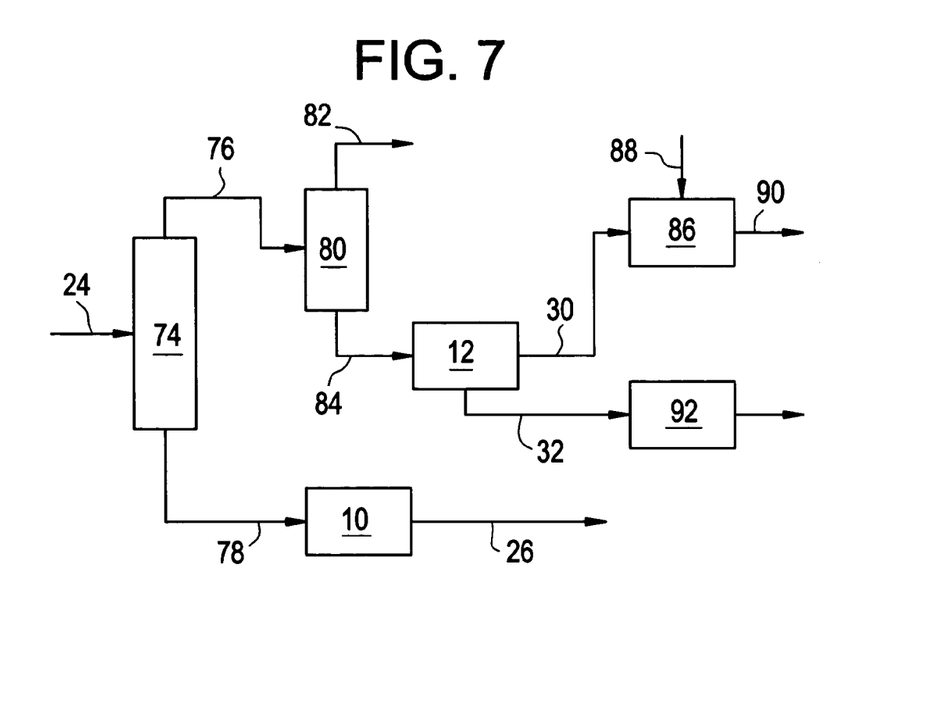
FIG. 7 is a schematic illustration of an embodiment of a method of removing benzene from a hydrocarbon feedstock by concentrating benzene prior to benzene saturation.

FIG. 7 is a schematic illustration of an embodiment of a method of removing benzene from a hydrocarbon feedstock by concentrating benzene prior to benzene saturation. In one embodiment, the hydrocarbon feedstock 24 is fed to the pre-fractionation unit 74, which may be a distillation device such as a distillation column. The pre-fractionation unit 74 essentially acts as a splitter, wherein $C_6$ and lighter materials are removed in a top stream 76 and $C_7$ and heavier materials are removed in a bottom stream 78. The bottom stream 78 may be fed to the reformer 10 where it is catalytically reacted to produce a reformate stream 26 that is rich in aromatic compounds. The top stream 76, on the other hand, may optionally be fed to a fractionation unit 80, wherein $C_5$ and lighter materials are removed in a top stream 82 and $C_6$ and heavier materials are removed in a bottom stream 84. The pre-fractionation unit 74 and the fractionation unit 80 may be distillation devices such as distillation columns. The number of trays, reflux ratio, and the like of the distillation device vary depending on the desired composition of the respective overhead streams.

The bottom stream 84 is in fluid communication with the membrane 12. The membrane unit 12 generates a permeate stream 30 that is benzene rich and a retentate stream 32 that is benzene lean using perstractive separation techniques, pervaporation separation techniques, and the like. In one embodiment, the permeate stream 30 is in fluid communication with a benzene saturation unit 86.

In operation, a hydrogen stream 88 and the permeate stream 30 are fed to the benzene saturation unit 86, where they are catalytically reacted to saturate benzene with hydrogen. Suitable catalyst employed in the benzene saturation unit 86 include, but are not limited to, platinum, rhenium, cobalt, molybdenum, nickel, tungsten, palladium, and combinations comprising at least one of the foregoing. Employing the membrane unit 12 upstream of the benzene saturation unit 86 advantageously reduces the size of the benzene saturation unit compared to benzene separation units that would be employed if the membrane unit 12 were not employed, thereby reducing equipment capital costs. Further, the resulting exit stream 90 is essentially benzene free. At the same time, the retentate stream 32 may optionally be fed to an isomerization unit 92 or fed directly to the gasoline blending pool. In the isomerization unit 92, cyclohexane, for example, is isomerized to higher-octane product such as methyl cyclopentane. However, it is to be understood that other isomerization reactions can occur in the isomerization unit 92.

Figure 8:
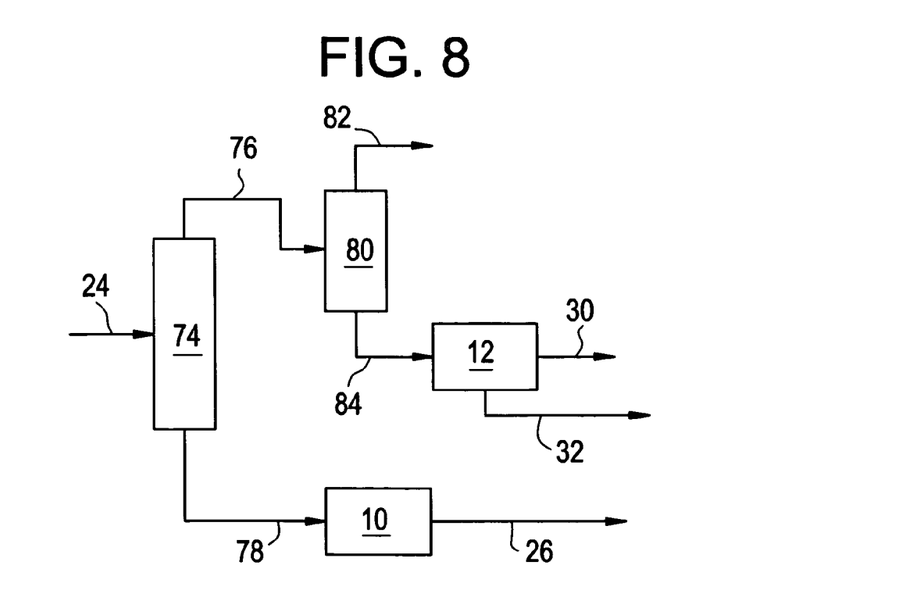
FIG. 8 is a schematic illustration of an embodiment of a method of removing benzene from a hydrocarbon feedstock using membrane separation.

FIG. 8 is a schematic illustration of an embodiment of a method of removing benzene from a hydrocarbon feedstock using membrane separation. Unlike the embodiment illustrated in FIG. 7, benzene is not converted to isohexane. Rather, benzene is separated, which can later be sold as a recovered product. For example, the hydrocarbon feedstock 24 is fed to the pre-fractionation unit 74. Again, the pre-fractionation unit 74 essentially acts as a splitter, wherein $C_6$ and lighter materials are removed in a top stream 76 and $C_7$ and heavier materials are removed in a bottom stream 78. The bottom stream 78 may be fed to the reformer 10 where it is catalytically reacted to produce a reformate stream 26 that is rich in aromatic compounds. The top stream 76, on the other hand, may optionally be fed to a fractionation unit 80, wherein $C_5$ and lighter materials are removed in a top stream 82 and $C_6$ and heavier materials are removed in a bottom stream 84. The pre-fractionation unit 74 and the fractionation unit 80 may be distillation devices such as distillation columns.

The bottom stream 84 is in fluid communication with the membrane unit 12. The membrane unit 12 generates a permeate stream 30 that is benzene rich and a retentate stream 32 that is benzene lean using perstractive separation techniques, pervaporation separation techniques, and the like. The retentate stream 32 may optionally be fed to an isomerization unit 92 or fed directly to the gasoline blending pool. The permeate stream 30 may be further processed to recover benzene. Benzene recovery methods include, but are not limited to, those methods embodied in FIGS. 1-6.

Figure 9:
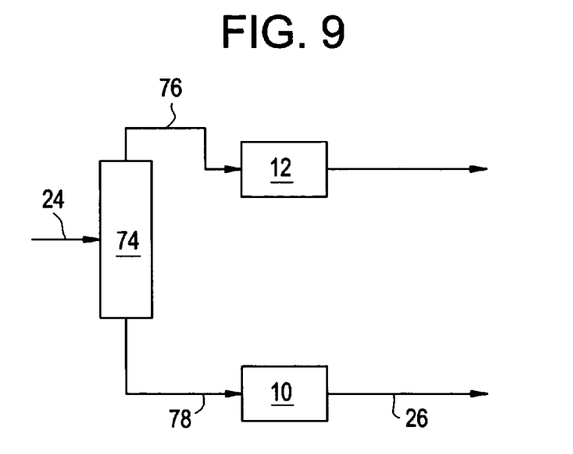
FIG. 9 is a schematic illustration of an embodiment of a method of removing benzene from a hydrocarbon feedstock using membrane separation.

FIG. 9 is a schematic illustration of an embodiment of a method of removing benzene from a hydrocarbon feedstock using membrane separation. FIG. 9 is included to illustrate simply an embodiment where a hydrocarbon feedstock is split prior to being sent to the membrane unit 12 and the reformer 10. For example, the hydrocarbon feedstock 24 is fed to the pre-fractionation unit 74. Again, the pre-fractionation unit 74 essentially acts as a splitter, wherein $C_6$ and lighter materials are removed in a top stream 76 and $C_7$ and heavier materials are removed in a bottom stream 78. The bottom stream 78 may be fed to the reformer 10 where it is catalytically reacted to produce a reformate stream 26 that is rich in aromatic compounds. The top stream 76 is in fluid communication with the membrane unit 12. The membrane unit 12 generates a permeate stream 30 that is benzene rich and a retentate stream 32 benzene stream that is benzene lean using perstractive separation techniques, pervaporation separation techniques, and the like. The retentate stream 32 may optionally be fed to an isomerization unit 92 or fed directly to the gasoline blending pool. The permeate stream 30 may be further processed to recover benzene. Benzene recover methods include, but are not limited to, those methods embodied in FIGS. 1-6.

Other embodiments are envisioned where a reformer, pyrolysis unit, and the like are disposed upstream of and in fluid communication with the membrane unit. Some of these embodiments are illustrated in FIGS. 1-6. Furthermore, other embodiments are envisioned where the membrane unit is disposed upstream of and in fluid communication with a benzene saturation unit, as illustrated for example in FIG. 7. One of skill in the art will readily understand that numerous combinations of methods can be employed. More specifically, one of skill in the art will understand that in FIGS. 1-9 apparatus may be added or omitted as part of the method based on the desired application. The scope of this disclosure broadly covers any method where membrane separation is employed prior to benzene saturation and/or any method where membrane separation is employed prior to aromatic extraction.

EXAMPLE

Figure 10:
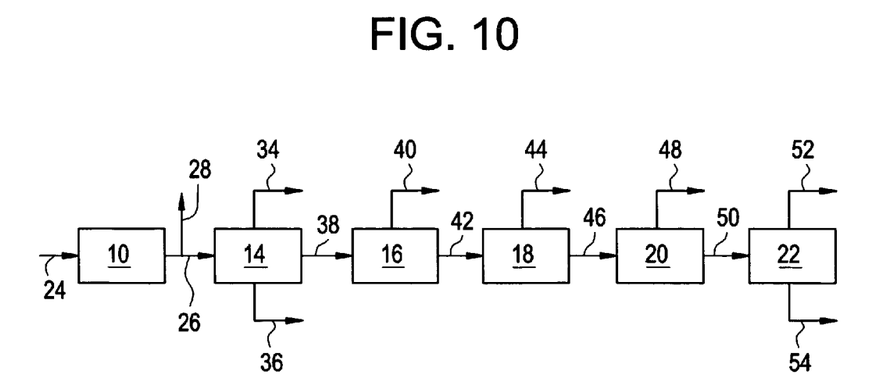
FIG. 10 is a schematic illustration of an embodiment of a method of separating at least benzene from a hydrocarbon feed stream without using membrane separation.

Comparative Example 1: Computer calculation was performed with a modeling program, ASPEN (Aspen Technology, Inc., Cambridge, Mass.), to illustrate an extraction process without using a membrane upstream of the extraction process. The Aspen program generated predicted membrane performance data on the following assumptions. The process was assumed to be carried out as shown in FIG. 10. The process was assumed to be carried out in a manner where a reformate stream was sent to the pre-fractionation column. The aromatics-enriched permeate stream was passed to an extraction unit. The aromatics extract from the extraction unit were sent to BTX columns to recover individual benzene, toluene, and xylene products by simple fractionation.

The flow rate of the reformate to the pre-fractionation column was assumed to be 28 kbd (thousand barrel per day), and the feed was assumed to contain 61 volume percent aromatics. After the pre-fractionation step, a 20 kbd stream was sent to the extraction column. The calculations indicate that the throughput of benzene, toluene, and xylene product are 2.0 kbd, 4.3 kbd, and 6.1 kbd, respectively.

The molecular composition of the feedstream, permeate, and retentate were entered into ASPEN as indicated below.

|  | feed vol % | permeate vol % | retentate vol % |
| --- | --- | --- | --- |
| i-Butane | 0.1 | 0.1 | 0.2 |
| n-Butane | 0.6 | 0.6 | 0.6 |
| 1-Butene | 0.0 | 0.0 | 0.0 |
| i-Pentane | 8.3 | 5.1 | 11.5 |
| n-Pentane | 5.0 | 4.2 | 5.9 |
| C5 olefins | 1.3 | 2.6 | 0.0 |
| Cyclopentane | 2.3 | 1.9 | 2.6 |
| 22-Mbutane | 0.1 | 0.0 | 0.2 |
| 23-Mbutane | 0.1 | 0.1 | 0.2 |
| 2-Mpentane | 1.3 | 0.7 | 1.9 |
| 3-Mpentane | 1.3 | 0.7 | 1.9 |
| n-Hexane | 6.1 | 4.1 | 8.1 |
| C6 olefins | 0.4 | 0.5 | 0.3 |

-continued

|  | feed vol % | permeate vol % | retentate vol % |
| --- | --- | --- | --- |
| Mcyclopentane | 0.2 | 0.1 | 0.4 |
| Benzene | 7.2 | 11.2 | 3.3 |
| Cyclohexane | 0.1 | 0.1 | 0.1 |
| 22-Mpentane | 0.1 | 0.0 | 0.2 |
| 23-Mpentane | 0.1 | 0.0 | 0.2 |
| 24-Mpentane | 0.1 | 0.0 | 0.2 |
| 2-Mhexane | 1.0 | 0.5 | 1.6 |
| 3-Mhexane | 1.0 | 0.4 | 1.6 |
| 3-Epentane | 1.0 | 0.4 | 1.6 |
| n-Heptane | 6.0 | 3.3 | 8.7 |
| C7 olefins | 0.3 | 0.2 | 0.3 |
| 11Mcycpentane | 0.3 | 0.1 | 0.6 |
| Ecyclopentane | 0.3 | 0.1 | 0.5 |
| Toluene | 15.2 | 21.3 | 9.1 |
| Mcyclohexane | 0.1 | 0.0 | 0.1 |
| multi-branched C8 paraffins | 0.1 | 0.0 | 0.1 |
| single-branched C8 paraffins | 0.3 | 0.1 | 0.5 |
| C8 olefins | 0.0 | 0.0 | 0.0 |
| n-Octane | 0.3 | 0.1 | 0.5 |
| C8 cyclopentane derivatives | 0.1 | 0.0 | 0.2 |
| E-Benzene | 4.0 | 4.5 | 3.6 |
| o-Xylene | 5.5 | 6.1 | 4.9 |
| m-Xylene | 9.2 | 11.1 | 7.3 |
| p-Xylene | 3.2 | 4.2 | 2.2 |
| C8 cyclohexane derivatives | 0.0 | 0.0 | 0.1 |
| C9 isoparaffins | 0.1 | 0.0 | 0.2 |
| n-Nonane | 0.0 | 0.0 | 0.0 |
| C9 cyclopentane derivatives | 0.1 | 0.0 | 0.2 |
| C9 aromatics | 9.8 | 9.7 | 9.9 |
| C9 cyclohexane derivatives | 0.0 | 0.0 | 0.0 |
| C10 isoparaffins | 0.1 | 0.0 | 0.2 |
| n-Decane | 0.0 | 0.0 | 0.0 |
| C10 cyclopentane derivatives | 0.1 | 0.0 | 0.1 |
| C10 aromatics | 6.2 | 5.1 | 7.3 |
| C10 cyclohexane derivatives | 0.0 | 0.0 | 0.0 |
| C11 isoparaffins | 0.0 | 0.0 | 0.0 |
| n-C11 | 0.0 | 0.0 | 0.0 |
| C11 cyclopentane derivatives | 0.0 | 0.0 | 0.0 |
| C11 aromatics | 0.6 | 0.6 | 0.7 |
| C11 cyclohexane derivatives | 0.0 | 0.0 | 0.0 |

The results of the calculations are summarized in Table 1.

TABLE 1 baseline extraction case, no membrane
(Reformer severity = 97 RON (Research Octane Number),
MON (Motor Octane Number), DON (Road Octane
number = (RON + DON)/2
reformer feed cutpoint = 330° F.)

|  | Bbl/day | RON | MON | DON | Wt % benzene | Vol % aromatics |
| --- | --- | --- | --- | --- | --- | --- |
| Fraction of reformate to gasoline | 41748 | 97.0 | 84.2 | 90.6 | 8.1 | 61.0 |
| Pre-fractionation Feed | 27939 |  |  |  | 8.1 | 61.0 |
| Pre-fractionation Overhead | 5723 | 87.5 | 78.5 | 83.0 | 0.5 | 0.4 |
| Pre-frac. Bottoms | 2068 | 115.2 | 92.1 | 103.7 | 0.0 | 97.9 |
| Extraction feed | 20000 |  |  |  | 11.2 | 75.0 |
| Raffinate | 5225 | 37.1 | 31.8 | 34.5 | 0.0 | 1.4 |
| Benzene | 2005 |  |  |  |  |  |
| Toluene | 4250 |  |  |  |  |  |
| Xylene | 6094 |  |  |  |  |  |
| Xyl col Btms | 2574 | 118.8 | 97.6 | 108.2 | 0.0 | 100.0 |
| Total gas | 57338 | 92.2 | 79.7 | 86.0 | 5.9 | 52.6 |

Example 1: A computer calculation was performed using a membrane/extraction separation process. The process was assumed to be carried out as shown in FIG. 1. The membrane aromatic/aliphatic selectivity was assumed to be 1.82. The flow rate of the reformate to the membrane unit was assumed to be 52 kbd, and the feed was assumed to contain 61 volumetric percent aromatics. After the membrane separation, a stream of 26 kbd with 73.6 volume percent aromatics was sent to the pre-fractionation column. After pre-fractionation, a 20 kbd stream was sent to the extraction column. The results of the calculations are summarized in Table 2.

TABLE 2 membrane at 50% stage cut
(Reformer severity = 97 RON, reformer feed cutpoint = 330° F.)

|  | Bbl/day | RON | MON | DON | Wt % benzene | Vol % aromatics |
| --- | --- | --- | --- | --- | --- | --- |
| Reft to gas | 17646 | 97.0 | 84.2 | 90.6 | 8.1 | 61.0 |
| Retentate to gas | 26032 | 88.5 | 77.0 | 82.8 | 3.4 | 47.9 |
| Permeate to PF | 26032 |  |  |  | 12.8 | 74.1 |
| PF Ovhd | 4107 | 87.6 | 77.6 | 82.6 | 0.5 | 0.4 |
| PF Btms | 1783 | 116.3 | 93.1 | 104.7 | 0.0 | 99.5 |
| Extr feed | 20000 |  |  |  | 16.6 | 87.5 |
| raffinate | 2719 | 35.7 | 30.0 | 32.9 | 0.0 | 2.4 |
| benzene | 2990 |  |  |  |  |  |
| toluene | 5689 |  |  |  |  |  |
| xylene | 6508 |  |  |  |  |  |
| Xyl col Btms | 2235 | 118.9 | 97.8 | 108.4 | 0.0 | 100.0 |
| Total gas | 54528 | 90.7 | 78.4 | 84.6 | 4.3 | 50.1 |

The process yielded 3.0 kbd of benzene, 5.7 kbd of toluene, and 6.5 kbd of xylene. This represents a 50% gain in benzene production and 35% gain in toluene production as compared to the base case in Comparative case 1, while maintaining the same extraction capacity in both cases. Additionally, the amount of benzene going to gasoline is significantly less than in the base case.

Advantageously, the method combination of membrane separation and extraction allows for efficient and economic recovery of BTX by, for example, incorporating a membrane unit to concentrate aromatics before they are extracted. Additionally, the membranes are a modular plant technology that allows for quick deployment, as well as flexibility in refining operations.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of diverting at least benzene from a hydrocarbon stream and enhancing the recovery of benzene and toluene from the diverted stream comprising:
   concentrating aromatics in the hydrocarbon stream by passing the hydrocarbon stream directly from a reformer through a membrane unit having at least one membrane to produce a permeate stream and a retentate stream, wherein the permeate stream is aromatics rich relative to the hydrocarbon stream and wherein the membrane comprises a polymer;
   feeding the permeate stream to a pre-fractionation column operated with a top, middle and bottom cut and feeding the middle cut of the pre-fractionation column to an extraction unit;
   extracting aromatics from the middle cut using a selective aromatics extraction solvent in an extraction unit to produce an extract stream, wherein the extract stream is aromatics rich relative to the permeate stream;
   fractionating the extract stream in a benzene distillation device to produce a benzene overhead stream and a benzene bottom stream, wherein the benzene overhead stream is rich in benzene relative to the extract stream;
   fractionating the benzene bottom stream in a toluene distillation device to produce a toluene overhead stream and a toluene bottom stream, wherein the toluene overhead stream is rich in toluene relative to the benzene bottom stream; and
   fractionating the toluene bottom stream in a xylene distillation device to produce a xylene overhead stream and a xylene bottom stream, wherein the xylene overhead stream is rich in xylene relative to the toluene bottom stream.

2. The method of claim 1, wherein the polymer is selected from the group consisting of polyesters, polyethers, polysulfones, polyimides, polyamides, polymers derived from bisphenol-A dianhydride, polyvinyl alcohols, polyacrylonitriles, polyurethanes, polyureas, polyacrylic acids, polyacrylates, elastomeric polymers such as polybutadiene, polyisoprenes, polyvinylpyridines, halogenated polymers, fluoroelastomers, polyvinyl halides, polysiloxanes, poly dimethyl siloxanes, a copolymer comprising at least one of the foregoing polymers, a blend comprising at least one of the foregoing polymers, an alloy comprising at least one of the foregoing polymers, or a combination comprising at least one of the foregoing polymers, copolymers, blends, or alloys.

3. The method of claim 1, wherein a selective aromatics extraction solvent is selected from the group consisting tetrahydrothiophene 1,1 dioxide, propylene carbonate, diethylene glycol, triethylene glycol, tetraethylene glycol, N-methyl pyrollidone, N-formyl morpholine, phenol, furfural, N,N-dimethyl formamide, dimethyl sulfoxide, and dimethyl-acetamide.

* * * * *

UNITED STATES PATENT AND TRADEMARK OFFICE
CERTIFICATE OF CORRECTION

| | | |
|---|---|---|
| PATENT NO. | : 7,642,393 B2 | Page 1 of 1 |
| APPLICATION NO. | : 11/543363 | |
| DATED | : January 5, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Twenty-first Day of December, 2010

David J. Kappos
*Director of the United States Patent and Trademark Office*